N. SUZUKI.
DIRECTION INDICATOR FOR VEHICLES.
APPLICATION FILED SEPT. 25, 1916. RENEWED MAR. 8, 1920.
1,338,112. Patented Apr. 27, 1920.
Fig. 1.
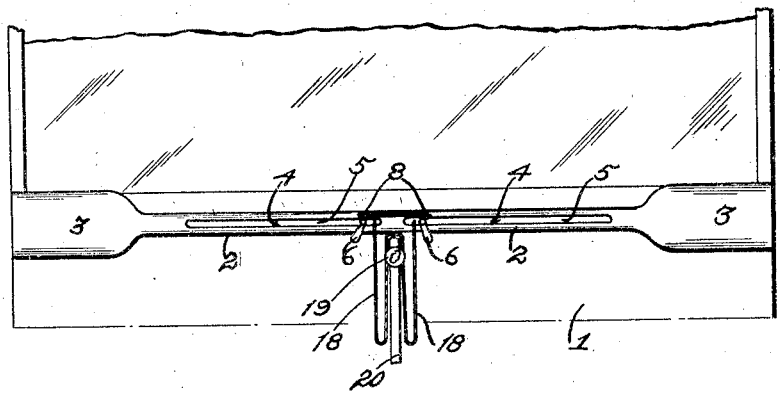
Fig. 2.
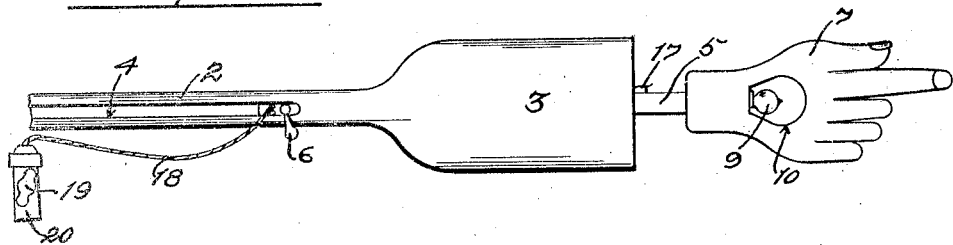
Fig. 3.
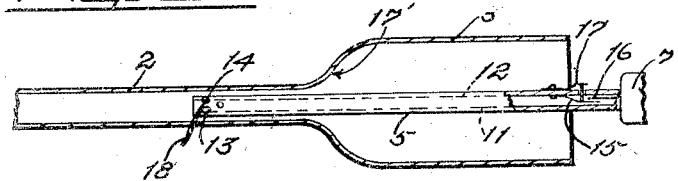
Fig. 4.
WITNESS
Wm G. Drew
INVENTOR.
N Suzuki
BY
ATTORNEYS

UNITED STATES PATENT OFFICE.

NIHEI SUZUKI, OF SAN FRANCISCO, CALIFORNIA.

DIRECTION-INDICATOR FOR VEHICLES.

1,338,112.	Specification of Letters Patent.	Patented Apr. 27, 1920.

Application filed September 25, 1916, Serial No. 121,968. Renewed March 8, 1920. Serial No. 364,324.

*To all whom it may concern:*

Be it known that I, NIHEI SUZUKI, a subject of the Emperor of Japan, residing at the city and county of San Francisco and State of California, have invented certain new and useful Improvements in Direction-Indicators for Vehicles, of which the following is a specification.

The present invention relates to a device by means of which the driver of a vehicle can indicate to other users of the road the future course of said vehicle.

The object of the invention is to provide a device of the described type which is simple in construction and easy to operate, and which may be readily attached to any vehicle, without detracting from the appearance thereof. A further object is to provide a direction indicator which is visible both by night and by day, and which, when not in use, is not confusing to other users of the road.

To this end the invention consists in the novel device hereinafter fully described with reference to the accompanying drawings, wherein—

Figure 1 is a rear elevation of the device as applied to the dash-board or wind-shield of a vehicle, showing the preferred method of its installation.

Fig. 2 is an elevation, enlarged, of one side of the device.

Fig. 3 is a sectional view of the same, showing the electrical connections.

Fig. 4 is a detail view illustrating a modified form of indicator.

In the drawings, the reference numeral 1 designates the dash-board or wind-shield of a vehicle. Secured thereto, within reach of the driver of the vehicle, is a transversely disposed guide or tube 2, having an enlarged portion 3 at each end, and slots 4 extending from the center to said end portions 3. Slidably mounted within each end of the tube 2 is a rod 5 having a handle 6 projecting through the slot 4, and carrying at its outer end an indicator 7, which may be either in the form of a hand, as shown in Fig. 2, or an arrow, as shown in Fig. 4, or in any other suitable form not illustrated.

The rods 5 may be moved lineally within the guide 2 by means of the handles 6. When one of said rods is in its extended, or indicating position, as shown in Fig. 2, the indicator 7 carried thereby projects beyond the side of the vehicle, and is plainly visible from both front and rear; and when retracted, as shown in Fig. 1, said indicator 7 is concealed within the enlarged end portion 3 of the guide 2. A pair of spring latches 8, Fig. 1, engage the handles 6 to retain the indicators in their retracted or concealed positions.

Associated with each indicator 7 is an electric light 9, Fig. 2, preferably positioned within an aperture 10 formed in said indicator. The rod 5 carries two conductors 11 and 12, Fig. 3, the conductor 11 extending continuously from a suitable connector or binding post 13 to the lamp 9. The other conductor 12 extends from a similar connector 14 to a movable switch blade 15 secured to the rod 5 at a point near the indicator 7. A stationary switch blade 16, adapted for electrical contact with said movable blade 15, is connected by a conductor, not shown, with the lamp 9.

Connected mechanically with the movable switch contact member 15 is a spring blade 17, which normally holds the switch closed, but which is adapted to engage the shoulder 17' at the inner end of the enlarged end portion 3 of the guide 2 when the rod is retracted, and to be moved by such engagement to open the switch. Thus the lamp circuit is automatically broken when the indicator is retracted within its concealing shield 3.

The connectors 13 and 14 of each indicator are connected by means of flexible conductors 18 with a common switch 19 mounted upon a suitable centrally disposed conduit 20. It is understood that suitable conductors, not shown, supply current from a source of electricity, also not shown, to said switch 19. Thus when the switch 19 is operated to close the circuits, the lamp 9 of either indicator 7 will be automatically illuminated when said indicator is moved to its extended position.

The invention has been hereinbefore described and is herewith illustrated in its preferred form, but I do not wish to be restricted thereto, for the reason that many changes may be made in the form and construction of the device without departing from the spirit of the invention as expressed in the claim hereto appended.

Having thus described my invention, what I claim as new and desire to protect by Letters Patent is:—

A direction indicator for vehicles comprising a continuous tubular guide member mounted transversely upon the vehicle and having its opposite open ends enlarged providing indicator receiving pockets communicating at their inner ends with the contracted tubular portion of said guide member, a pair of independent members slidably mounted one within the opposite ends of said tubular guide, an indicator carried by the outer end of each slidable member, said indicators adapted to lie within the respective pockets at the opposite ends of said guide when retracted and to project therefrom when extended, said members being capable of independent manual movement in either direction relative to the respective ends of said guide, said guide provided at each side of its center with an independent longitudinal slot, a central solid portion dividing the inner ends of said slots, an operating handle carried by the inner end of each of said members and extending one through each of said slots and one slidable longitudinally within each of said slots with the movement of the respective members, and a spring clip member secured to said casing adjacent the inner ends of said slots and extended at their free ends over the inner ends of said slots and adapted for yieldably engaging said handles when the members are manually moved to the inner ends of their respective slots for retaining said members in their retracted position.

In testimony whereof I have signed my name to this specification in the presence of two subscribing witnesses.

NIHEI SUZUKI.

Witnesses:
    HARRY A. TOTTEN,
    D. B. RICHARDS.